United States Patent
Symons

(12) 
(10) Patent No.: US 6,335,058 B1
(45) Date of Patent: Jan. 1, 2002

(54) METHOD FOR TREATING A LIGNOCELLULOSIC MATERIAL

(75) Inventor: Michael Windsor Symons, Monument Park (ZA)

(73) Assignee: Windsor Technologies Limited, Nassau (BS)

( * ) Notice: Subject to any disclaimer, the term of this patent is extended or adjusted under 35 U.S.C. 154(b) by 0 days.

(21) Appl. No.: 09/445,683

(22) PCT Filed: Jun. 12, 1998

(86) PCT No.: PCT/GB98/01715

§ 371 Date: Dec. 10, 1999

§ 102(e) Date: Dec. 10, 1999

(87) PCT Pub. No.: WO98/56989

PCT Pub. Date: Dec. 17, 1998

(30) Foreign Application Priority Data

Jun. 12, 1997 (ZA) .............................................. 97/5200
Jul. 16, 1997 (ZA) .............................................. 97/6291
Mar. 30, 1998 (ZA) .............................................. 98/2638

(51) Int. Cl.$^7$ ................................................ B05D 7/08
(52) U.S. Cl. ........................ 427/382; 427/391; 427/392; 427/393; 427/393.4; 427/395; 427/396; 427/397; 427/441; 427/442
(58) Field of Search ................................ 427/381, 382, 427/175, 176, 296, 297, 298, 324, 325, 326, 385.5, 386, 389.9, 391, 392, 393, 394, 395, 396, 397, 439, 440, 441, 442, 393.4

(56) References Cited

U.S. PATENT DOCUMENTS 3,928,260 A * 12/1975 Eiland .......................... 260/14
3,984,594 A * 10/1976 Sano et al. .................. 427/392
4,457,800 A * 7/1984 Schure et al. ................ 427/386
4,489,176 A * 12/1984 Kluth et al. ................. 427/387
4,539,006 A * 9/1985 Langford .................... 8/94.22
4,596,725 A * 6/1986 Kluth et al. .............. 427/385.5
5,116,922 A * 5/1992 Sundararaman et al. .... 526/304
5,340,852 A * 8/1994 Pille-Wolf et al. ........ 427/385.5
5,344,897 A * 9/1994 Brindoepke et al. ......... 427/386
5,750,201 A * 5/1998 Phanopoulos et al. ... 427/385.5

FOREIGN PATENT DOCUMENTS

EP 107 155 5/1984
GB 1 064 510 4/1967

OTHER PUBLICATIONS

Kirk & Othmer, ed.s, Encyclopedia of Chemical Technology, Feb. 1997, pp. 928–945.*
Database WPI, Week 8530 Derwent Publications Ltd. Class A82, AN 85–182725, XP002078607 & SU 1 133 098 A, Jan. 7, 1985.

* cited by examiner

*Primary Examiner*—Shrive P. Beck
*Assistant Examiner*—Kirsten A. Crockford
(74) *Attorney, Agent, or Firm*—Pillsbury Winthrop LLP

(57) ABSTRACT

A method of manufacturing a finished product from a length of a lignocellulosic material, such as a length of solid wood or chip board, includes the steps of impregnating the length of lignocellulosic material through its depth with an impregnating composition comprising a mineral oil, a non-aqueous solvent for the material oil such as dichloromethane or super critical carbon dioxide, and a thermosetting resin and, if necessary, a catalyst therefore dissolved in the mineral oil and solvent. Thereafter, the non-aqueous solvent is removed and the product is subjected to an elevated temperature to polymerize the thermosetting resin to bind the mineral oil into the lignocellulosic material.

13 Claims, No Drawings

METHOD FOR TREATING A LIGNOCELLULOSIC MATERIAL

This application is the national phase of international application PCT/GB98/01715 filed Jun. 12, 1998 which designated the U.S.

BACKGROUND OF THE INVENTION

This invention relates to a method for the manufacture of a finished product from a length of a lignocellulosic material.

It is well known to manufacture composite board products from wood derived feed stocks. Examples are medium density fibre board (MDF), high density fibre board, orientated strand board, chip board and the like. Such boards are most frequently bound by condensation resins such as the urea, melamine or resole phenol formaldehydes. A new trend is to use agricultural fibre as a feed stock, because excellent fibre is produced, the resource is rapidly regenerative, it removes the pressure on the timber resource. In this case the isocyanates are the desired binder because the nature of the surface and composition of agricultural fibres, the particle shape and specific surface area give rise to more critical binder requirements.

In the case of all lignocellulosic composite board products, plywoods, paper products and solid timber, particularly the softwoods and the marginal hardwoods, water is by far the greatest contributor to degradation.

There is therefore a requirement for the treatment of lignocellulosic products to make them highly water resistant.

This requirement may be achieved by the pre-treatment of lignocellulosic materials in particulate form as feed stock for board production, or veneers for plywood production, or by the post treatment of composite boards themselves, such as chip board or MDF, pump and paper products and solid timber. EP 0 107 155A, and DATABASE WPI Lepton Ch, Week 8530, AN 85-182725 both disclose methods for the production of lignocellulosic products with improved water resistance.

Subsidiary improvements such as improved mechanical properties, behavior in fire, absence of formaldehyde and resistance to microbial or insect attack may also be provided for.

There is always the need for improved methods of manufacture of products from lignocellulosic material.

SUMMARY OF THE INVENTION

According to the invention there is provided a method of improving the water resistance of a length of lignocellulosic material including the steps of:
 (a) impregnating the length of lignocellulosic material through its depth with an impregnating composition comprising a solution of:
  (i) a mineral oil;
  (ii) a thermosetting resin and, if necessary, a catalyst therefor; and
  (iii) a non-aqueous solvent for the mineral oil and for the thermosetting resin and catalyst therefor;
 (b) removing the non-aqueous solvent from the product of step (a); and
 (c) subjecting the product of step (b) to an elevated temperature to polymerise the thermosetting resin.

The term "a length of a lignocellulosic material" includes lengths of solid wood, wood veneer and plywood; lengths of preformed composite boards such as chip board, medium density fibre board, high density fibre board, orientated strand board, and boards made from paper mill sludge, common mixed paper waste and sawdust; and lengths of virgin and recycled paper and cardboard.

The non-aqueous solvent is preferably dichloromethane or super critical liquid carbon dioxide.

The mineral oil and the thermosetting resin must be soluble in the non-aqueous solvent so that the impregnating composition is a solution The thermosetting resin is preferably an isocyanate thermosetting resin or a precursor thereof, more preferably a resin derived from diphenylmethane-4,4'-diisocyanate (MDI).

The impregnating composition preferably comprises from 2% to 30% inclusive by mass of the impregnating composition of the mineral oil, preferably from 7% to 25% inclusive by mass of the impregnating composition of the mineral oil; from 1% to 25% inclusive by mass of the impregnating composition of the thermosetting resin optionally with a catalyst therefor, preferably from 2.5% to 15% inclusive by mass of the impregnating composition of the thermosetting resin optionally with a catalyst therefor; the remainder of the impregnating composition comprising the non-aqueous solvent and optional components, if any.

The impregnating composition is preferably impregnated into the length of the lignocellulosic material in an amount of from 0.4 to 2 parts inclusive by mass of the impregnating composition to 1 part by mass of the lignocellulosic material, preferably in the range of from 0.5 to 1.5 parts inclusive by mass of the impregnating composition to 1 part by mass of the lignocellulosic material. In general, the uptake depends upon the nature of the lignocellulosic material being treated.

In step (a), the impregnation may be carried out in any suitable manner, for example by immersion of the length of the lignocellulosic material in the impregnating composition, optionally with the application of pressure.

In step (b), the non-aqueous solvent may be removed in any suitable manner, for example by means of heat. The solvent, particularly when it is dichloromethane, is preferably recovered for reuse.

In step (c), the product of step (b) may be subjected to an elevated temperature in any suitable manner, for example in a heating chamber or kiln, to an elevated temperature which is sufficiently high to cause polymerisation of the thermosetting resin, for example a temperature of around 75° C. to 185° C. inclusive, preferably around 120° C., for a sufficient period of time, for example from 0.5 to 3 hours inclusive, preferably around 1.5 hours. The impregnating composition may also include various optional components such as:
 (iv) a preservative such as a bactericide, fungicide or insecticide, or the like preferably in an amount of from 0.25% to 5% inclusive by mass of the impregnating composition of the preservative;
 (v) a dicarboxylic anhydride or a tricarboxylic anhydride soluble in the impregnating composition, preferably in an amount of from 0.5% to 8% inclusive by mass of the impregnating composition of the anhydride, preferably an amount of about 2.5% by mass of the impregnating composition of the anhydride;
 (vi) other additives selected from fire retardants, ultraviolet light absorbers, dyes and anti-oxidants, and the like

DESCRIPTION OF EMBODIMENTS

The crux of the invention is a method of manufacturing a finished product from a length of a lignocellulosic material.

Lignocellulosic material refers to any plant material emanating from the photosynthetic phenomenon.

The length of lignocellulosic material may be selected from:

1. Rotary peeled or sliced veneer destined for the manufacture of ply wood or laminate products such as flooring or the like.
2. Preformed composite boards such as medium density fibre board, high density fibre board, chip board, particle board, flake board, orientated strand board, laminated veneer lumber, and boards made from paper mill sludge, common mixed paper waste and sawdust.
3. Solid wood either in sliced or sawn or plank condition.
4. Paper products such as virgin kraft, recycled paper chip, carton board or pulp products.

Natural plant fibres or particles, or end products from these, are comprised of hemi-celluloses, celluloses and lignin. An increase in the moisture content of these materials results in swelling because the cell wall polymers of the material contain hydroxyl or other oxygen containing groups that attract water through hydrogen bonding. The hemi-celluloses are the most hygroscopic. It is the moisture that swells the cell walls and causes the expansion of the material until the cell walls are saturated with water. This can obviously give rise to degradation as a result of attack by micro-organisms as well as bulking and dimensional instability which, in the case of board composites, can result in their destruction. This phenomenon applies to all of the lignocellulosic material groups described in this invention.

It is known to modify lignocellulosic materials chemically principally by the use of anhydrides and to synergistically resinate the material with isocyanate resins. The chemical modification of the celluloses serves to minimize the phenomenon of hydrogen bonding by reducing the number of available hydroxyl groups. However, it is the crux of this invention that water contact with these groups is minimized by the interposition of a hydrophobic cohesive film, formed by the mineral oil/thermosetting resin.

The crux of the invention is thus that the lignocellulosic material is impregnated with an impregnating composition which must comprise a mineral oil, a thermosetting resin, and a non-aqueous solvent for the mineral oil and thermosetting resin.

The choice of solvent is an important aspect of this invention. The preferred solvent is dichloromethane because of its very high solvency as a carrier for the mineral oils, propagating the penetration of the impregnating composition and the intimate wetting of the cellular matrix of the lignocellulosic material. Further advantages are ease of handling, low boiling point, high evaporative rate, low latent beat of vaporisation, inertness and therefore an absence of chemical interference, inflammability and very low explosion danger, and finally ease of recovery with a boiling point of 39° C.

The other and less preferred solvent is super critical liquid carbon dioxide with process parameters in the region of 18 bar (1800 kPa) pressure and minus 40° C. temperature.

An important advantage of the preferred solvent is that no bulking, swelling or loss of cohesion of the treated material is induced during treatment.

Other less suitable solvents are methyl acetate, ethyl acetate, benzene, trichloroethylene and white spirits.

It is preferred that the solvent, particularly when it is dichloromethane, be recovered for reuse.

The oil must be a mineral oil, preferably a low viscosity paraffinic or naphthenic mineral oil which is inert.

Examples of suitable mineral oils are:

Waksol-F, provided by the Carbo-Tar Division of Sasol Chemical Industries Limited of South Africa, which is a coal derived mineral oil of flash point of 107.5° C., a water content of 0.05% and a wax content of between 10 and 15% of a wax dissolved in the oil at elevated temperatures the wax having a pour point of 30 to 40° C. The density of this oil is 0.9 g/cm$^3$.

Parprol 22 of Engen (Mobil Chemicals) of South Africa being a low viscosity honey coloured petroleum derived paraffinic process oil, with or without wax inclusion. Parprol 22 has a density of 0.859 g/cm$^3$, viscosity in cSt at 40° C. of 20,6 (1cSt=1×10$^{-6}$m$^{2/5}$), carbon type analysis and percentages - aromatics 3, anphthenics 28, and paraffinics 69, a neutralization number mgKOH/g of 0.01, and a flash point of 196° C.

Shell Base Oil code MVI (P1300) with a polycyclic aromatic content of 2.9%, a sulphur percentage of 2%, a total acid number of 0.1 mg KOH/g.

Further, examples are Quendilla 19, a process oil, or Transcal N, which is a low viscosity heat transfer oil, both by British Petroleum.

In general, it is the paraffinic oils as against the naphthenic oils that are preferred on grounds of cost. Also suitable are those in which appropriate percentages of wax may be dissolved and whose solution is stable in the solvent of choice in this invention, preferably dichloromethane. The mineral oils in the context of the invention are process oils for the purpose of water proofing the lignocellulosic materials and they are inert and do not cross link with the thermosetting resins, i.e. isocyanate or polyester resins that may be used, there being no available hydroxyl or other reactive groups in their chemical make up.

The impregnating composition must also include a thermosetting resin which is soluble in the non-aqueous solvent.

The thermosetting resin is preferably an isocyanate thermosetting resin.

Isocyanates are compounds containing the group—N=C=O and are characterised by the general formula:

$$R(NCO)_x$$

wherein x is variable and denotes the number of NCO groups, and R denotes a suitable group.

Examples of organic isocyanates include aromatic isocyanates such as m- and p-phenylenediisocyanate, toluene-2,4- and 2,6-diisocyanates, diphenylmethane-4,4'diisocyanate, diphenylmethane-2,4-diisocyanate, chlorophenylene-2,4-diisocyanate, diphenylene-4,4'-diisocyanate, 4,4'diisocyanate-3,3'dimethyldiphenyl, 3-methyldiphenylmethane-4,4'-diisocyanate and diphenyletherdiisocyanate, 2,4,6-triisocyanatotoluene and 2,4,4'-triisocyanatodiphenylether. There may be present mixtures of isocyanates for example a mixture of toluene diisocyanate isomers such as the commercially available mixtures of 2,4- and 2,6-isomers and also the mixtures of di and higher polyisocyanates produced by phosgenation of aniline/formaldehyde condensates. Such mixtures are well known in the art and include the crude phosgenation products containing mixtures of methylene bridged polphenylpolyisocyanates including diisocyanate, triisocyanate and higher polyisocyanates together with any phosgenation by-products.

Preferred compositions are those wherein the isocyanate is an aromatic diisocyanate or polyisocyanate of higher functionality, in particular crude mixtures of methylene bridged polphenylpolyisocyanates containing diisocyanate, triisocyanate and higher functionality polyisocyanates. The methylene bridged polphenylpolyisocyanates are well known in the art and are sometimes referred to as polymeric methylene bridged polyphenyldiisocyanate (MDI) having an isocyanate functionality ranging from 2,5–3 and other products sometimes referred to as crude MDI having higher functionality. They are prepared by phosgenation of corresponding mixtures of polyamines obtained by condensation of aniline and formaldehyde.

Specific examples of suitable isocyanates are those having an (NCO) content percentage preferably exceeding 20%, more preferably exceeding 25%. These isocyanates promote latency or reduced reactivity because of the high number of NCO groups, and provide the maximum capacity for hydroxyl bonding. Examples are Desmadur VKS or Desmadur VK by Bayer, which are solvent free mixtures of aromatic polyisocyanates such as diphenyl methane-4,4 diisocyanate and polymeric matter. These and similar are among those referred to as MDIs in the industry. A further description used is a diisocyanate-diphenylmethane, further examples being Suprasec DNR-5005, which is a polymeric MDI, or Suprasec 2020 which is a monomeric MDI with available NCO percentages of 30.7% and 29% and which are polymeric MDI with standard functionality and monomeric MDI respectively. The Suprasec resins are supplied by ICI. A further example of a crude MDI is Voronate M 229 by Dow Chemical Company.

Further suitable diisocyanates are the toluene diisocyanates with the alternative names tolylene diisocyanate or toluylene diisocyanate with the abbreviation TDI, such as Desmadur L75 by Bayer.

It is to be noted that the term "isocyanate thermosetting resin" is intended to include the resins per se, as well as those components which may be regarded as precursors of the resins, such as MDIs and TDIs.

A further example of the principle of wood esterification is the use of ethyl isocyanate which reacts with hydroxyl groups to form ethyl carbamate (urethane) according to the formula:

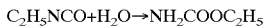

$$C_2H_5NCO+H_2O \rightarrow NH_2COOC_2H_5$$

The isocyanate resins are fully soluble in dichloromethane and react with the hydroxyl groups on the cellulose and hemi cellulose molecules of the lignocellulosic material to form a wood ester. In this way they form a chemical bond adhesion rather than a cohesive adhesion. The isocyanates help bind the mineral oil into the lignocellulosic matrix.

Other examples of suitable thermosetting resins are as follows:

Unsaturated polyester resins typically as used in dough moulding or sheet moulding, catalysed by temperature triggered catalysts. An example is Ultraset 997 by NCS Resins of South Africa, catalysed by Triganox 29B50, polymerisation commencing in the temperature range of 110° C. to 150 ° C. Epoxy resins such as the Epikote series by Shell Chemicals or Araldite PY 340.2 by Ciba-Geigy, with latent heat triggered catalysts in the range of 80° C. such as the boron trifluorides by Anchor Chemicals or aromatic polyamines such as Ancamine SRX. Methyl methacrylates, acrylics or methacrylic acid esters, with appropriate catalysts.

The impregnating composition preferably comprises from 2% to 30% inclusive, more preferably from 7% to 25% inclusive by mass of the impregnating composition of the mineral oil; from 1% to 25% inclusive, preferably from 2.5% to 15% inclusive by mass of the impregnating composition of the thermosetting resin, optionally with a catalyst therefor; the remainder comprising the additional components and the solvent.

Preferably, the length of lignocellulosic material has an uptake of the impregnating composition in an amount of from 0.4 parts to 2 parts inclusive by mass of the impregnating composition to 1 part by mass of the lignocellulosic material, more preferably from 0.5 parts to 1.5 parts inclusive by mass of the impregnating composition per 1 part by mass of the lignocellulosic material. In general, the uptake depends upon the nature of the lignocellulosic material. Typical uptakes for various types of lignocellulosic material are set out below:

Medium density fibre board - 0.68 parts by mass of impregnating composition to 1 part by mass of board.

Southern Yellow Pine with a 12% moisture content 1.25 parts by mass of the impregnating Composition to 1 part by mass of the pine.

Poplar - 1.45 parts by mass of the impregnating composition to 1 part by mass of the poplar.

Spruce - 0.75 parts by mass of the impregnating composition to 1 part by mass of the spruce.

Virgin Kraft Paper - 0.65 parts to 0.9 parts by mass of the impregnating composition to 1 part by mass of the paper.

Recycled Paper - 0.9 parts to 1.25 parts by mass of the impregnating composition to 1 part by mass of the paper.

The impregnating composition may also include a preservative, such as a bactericide, fungicide or insecticide or the like, particularly a termiticide preferably in an amount of from 0.25% to 5% by mass of the impregnating composition of the preservative. Example of biocides are complexes of boron, atrazines, thiazoles or carbamates, and of termiticides are zinc or copper naphthanates, pyrethroids, oil compatible high boiling point tar acids, pentachlorophenol or tri-butyl tin oxide-lindanes.

The impregnating composition may also include a dicarboxylic anhydride or a tricarboxylic anhydride. The dicarboxylic anhydride may be maleic anhydride, phthalic anhydride, succinic anhydride or tetrahydrophthalic anhydried, preferably maleic anhydride. The tricarboxylic anhydride may be trimellitic anhydride.

The reaction between an anhydride and a lignocellulosic material at elevated temperature in the absence of solvents is an esterification reaction, yielding for example lignocellulosic maleate. The purpose of the use of an anhydride is to esterify the celluloses but also to scavenge any available hydroxyl groups or water thereby further promoting the latency of the isocyanates when used in the impregnating composition, and catalyzing the polymerization of the isocyanates once solvent is removed through the residual carboxylic groups. The anhydrides also propagate the denaturing of the lignocellulosic material during processing. The impregnating composition may contain between 0.5 and 8%, more preferably about 2.5% by mass of the impregnating composition of the anhydride.

The impregnating composition may also include other additives as set out below.

Fire or flame retardant chemicals may be added to the impregnating composition to great advantage. Considerable compatibility exists with the other components of the impregnating composition and the flame retardants used are selected for their solubility in the solvents of choice. Examples are Flyrol FR2-LV by Akzo Chemicals which is a tris(1,3-dichloroisopropyl) phosphate and Flyrol DMMP which is a dimethyl methalphosphenate with a phosphorus content of 25% and an acid number of 1.3 mgKOH/g. This also acts as an effective viscosity depressant. Flame retardants are added in the proportion of 0.25 to 5% of the total mass of the impregnating composition.

Solvent soluble light fast dyes such as the Savinyls or Solvoperms by Clariant may also be included in the impregnating composition at percentages of from 0.005% to 0.075% by mass of the impregnating composition, in order to colour code the material or to add beauty, such as in the case of sliced wood veneer.

Other additives include ultra-violet light absorbers, and anti-oxidants.

The first step of the method of the invention is to impregnate the length of lignocellulosic material with the impregnating composition. This may be achieved in any suitable manner. For example, the length of lignocellulosic material may be immersed in the impregnating composition. To give a specific example, a length of lignocellulosic material may be placed in a pressure vessel and subjected to a vacuum of the lowest level consistent with moisture percentage, i.e. 15 kPa for about 15 minutes for material at moisture equilibrium percentages typically of 12%. The effect of the vacuum is to remove intracellular and extra-cellular air to allow through penetration of the impregnating composition. Thereafter, the pressure vessel is flooded with the impregnating composition and this is subjected to a suitable elevated pressure to ensure through penetration of the length of lignocellulosic material with the impregnating composition.

In the further steps of the invention, the excess impregnating composition is removed and the non-aqueous solvent is removed and recovered, for example from a heated kiln. Finally, the impregnated material is subjected to suitable conditions of temperature to polymerise the thermosetting resin. Obviously, the polymerisation temperature will depend upon the nature of the thermosetting resin, but, in general, a temperature of around 80° C. to 120° C., for a period of time of 1.5 hours is sufficient to polymerise the thermosetting resin.

As indicated above, preferably, prior to step (a), the length of lignocellulosic material is dried to as low a level of moisture percentage as is economically feasible, preferably a moisture percentage of less than 20% by mass.

EXAMPLE 1

A An impregnating composition is formulated at the following percentages on a mass basis:

Dichloromethane - 73%

Waxol F by Sasol Carbotar Division containing 12% of a dissolved wax with a pour point of 30° to 40° C. - 21%.

Isocyanate MDI Code Suprasec 5005 by ICI Polyurethanes - 5%

Maleic anhydride - 1%

The following materials were treated:

| Material | Weight Before Treatment | Wet Weight Post Treatment | Uptake of Wet Liquor in g/g of Treated Material | Percentage of Waxol F left in the Material | Percentage of Isocyanate MDI left in Material |
|---|---|---|---|---|---|
| 6 mm MDF | 71 | 128 | 0.80 | 17% | 4% |
| 12 mm MDF | 141 | 250 | 0.27 | 16% | 3.8% |
| 19 mm Standard MDF | 236 | 386 | 0.64 | 13% | 3.2% |
| 12 mm Orienated strand board | 123 | 229 | 0.86 | 18% | 4.3% |
| Sub tropical pinus panila | 112 | 221 | 0.97 | 20% | 4.85% |

The treatment schedule was that the composite board materials and pine were placed in an autoclave, subjected to a vacuum generated by a liquid ring vacuum pump for 15 minutes, followed by the flooding of the chamber with the impregnating composition and subjecting the full chamber to a pressure of 8 bar (800 kPa) for 20 minutes. The impregnating composition was then transferred back to its holding tank, the dichloromethane recovered from the charge whilst still in the autoclave by the movement of pre-heated air on a closed loop cycle, the solvent laden air passing through three condensation stations, and finally through membranes before passing through a heat exchanger and back through the autoclave. In this way no emissions are made to the atmosphere at all. After the complete recovery of the solvent, the air temperature was raised to 120° C. for two hours and the charge removed. In the case of the thicker composites longer vacuum and pressure cycles must be adopted in order to achieve complete penetration of the impregnation composition through the composite.

EXAMPLE 2

An impregnating composition was made up according to the following components by mass:

Suprasec 5005—an MDI provided by ICI—12%

Parprol 22, a mineral oil from Engen—17%

Maleic anhydride—2.5%

A dye—Solvoperm by Clarient, which is a solvent soluble light fast dye—0.75%

Dichloromethane—67.75%

Lengths of poplar, basswood, tulipwood, cottonwood, and southern yellow pine were firstly subjected to a vacuum of 15 kPa for 20 minutes and then submerged in the impregnating composition, with an applied pressure of 7.5 bar (750 kPa) for 30 minutes. The pressure was then released and the impregnated lengths of lignocellulosic material were withdrawn from the impregnation chamber.

The lengths of lignocellulosic material were passed through a recovery kiln to remove and recover the dichloromethane, over a period of 24 hours.

Thereafter, the lengths of impregnated lignocellulosic material were subjected to an escalating temperature of up to 120° C. and kept at this temperature for 1.5 hours to polymerise the thermosetting resin. The lengths of lignocellulosic material so treated were suitable for use as exposed wood flooring.

Representative examples of the strengths obtained using the method of the invention, as disclosed in this example are as follows:

Poplar (Acer Rubrum) takes up the impregnating composition at the rate of 0.94% per 1 g of wood, yielding a treated hardness of 7160N in the Janka Ball 13 mm test, as against the untreated control value of 3100N.

Likewise, cottonwood (Populus Deltroides) has a treated hardness of 5430N as against the untreated control value of 1500N.

The primary object of the invention is to render lignocellulosic materials water resistant with a technology that allows the degree of hydrophobisation to be varied across wide limits depending upon the product's end application. Further, by use of the same impregnating composition with additives, improved mechanical properties such as hardness and modulus, appearance as a function of colour and surface patina, and resistance to fire may be achieved, and resistance to attack by fungi, wood borer or termites.

What is claimed is:

1. A method of improving the water resistance of a length of lignocellulosic material including the steps of:
   (a) impregnating the length of lignocellulosic material through its depth with an impregnating composition comprising a solution of:
      (i) a mineral oil;
      (ii) an isocyanate thermosetting resin or precursor thereof and, if necessary, a catalyst therefor; and
      (iii) a non-aqueous solvent for the mineral oil and for the thermosetting resin and catalyst therefor;
   (b) removing the non-aqueous solvent from the product of step (a); and
   (c) subjecting the product of step (b) to an elevated temperature to polymerise the thermosetting resin to bind the mineral oil into the lignocellulosic material.

2. A method according to claim 1 wherein the non-aqueous solvent is selected from the group consisting of dichloromethane and super critical carbon dioxide.

3. A method according to claim 1, wherein the isocyanate thermosetting resin is a resin derived from diphenylmethane-4,4'-diisocyanate, optionally with a catalyst therefor.

4. A method according to claim 1 wherein the impregnating composition comprises from 2% to 30% inclusive by mass of the impregnating composition of the mineral oil, from 1% to 25% inclusive by mass of the impregnating composition of the isocyanate thermosetting resin optionally with a catalyst therefor, the remainder of the impregnating composition comprising the non-aqueous solvent and any optional components.

5. A method according to claim 4 wherein the impregnating composition comprises from 7% to 25% inclusive by mass of the impregnating composition of the mineral oil, from 5% to 15% inclusive by mass of the impregnating composition of the isocyanate thermosetting resin optionally with a catalyst therefor, the remainder of the impregnating composition comprising the non-aqueous solvent and any optional components.

6. A method according to claim 1 wherein the impregnating composition is impregnated into the length of the lignocellulosic material in an amount of from 0.4 to 2 parts inclusive by mass of the impregnating composition to 1 part by mass of the lignocellulosic material.

7. A method according to claim 6 wherein the impregnating composition is impregnated into the length of the lignocellulosic material in an amount of from 0.5 to 1.5 parts inclusive by mass of the impregnating composition to 1 part by mass of the lignocellulosic material.

8. A method according to claim 1 wherein in step (a), the length of lignocellulosic material is impregnated with the impregnating composition by immersion of the length of lignocellulosic material in the impregnating composition, optionally with the application of pressure.

9. A method according to claim 1 wherein in step (b), the non-aqueous solvent is removed from the product of step (a) by means of heat.

10. A method according to claim 9 wherein in step (b) the solvent is recovered for reuse.

11. A method according to claim 1 wherein in step (c) the product of step (b) is subjected to a temperature of from 75° C. to 185° C. inclusive for a period of time from 0.5 hours to 3 hours inclusive to polymerise the thermosetting resin to form the finished product.

12. A method according to claim 1 wherein the impregnating composition includes a preservative in an amount of from 0.25% to 5% inclusive by mass of the impregnating composition of the preservative.

13. A method according to claim 1 wherein the impregnating composition includes a dicarboxylic anhydride or a tricarboxylic anhydride soluble in an impregnating composition, in an amount of from 0.5% to 8% inclusive by mass of the impregnating composition of the anhydride.

* * * * *